April 19, 1966 M. L. ABEL 3,246,511
LOAD INDICATING DEVICE
Filed March 13, 1963 4 Sheets-Sheet 1
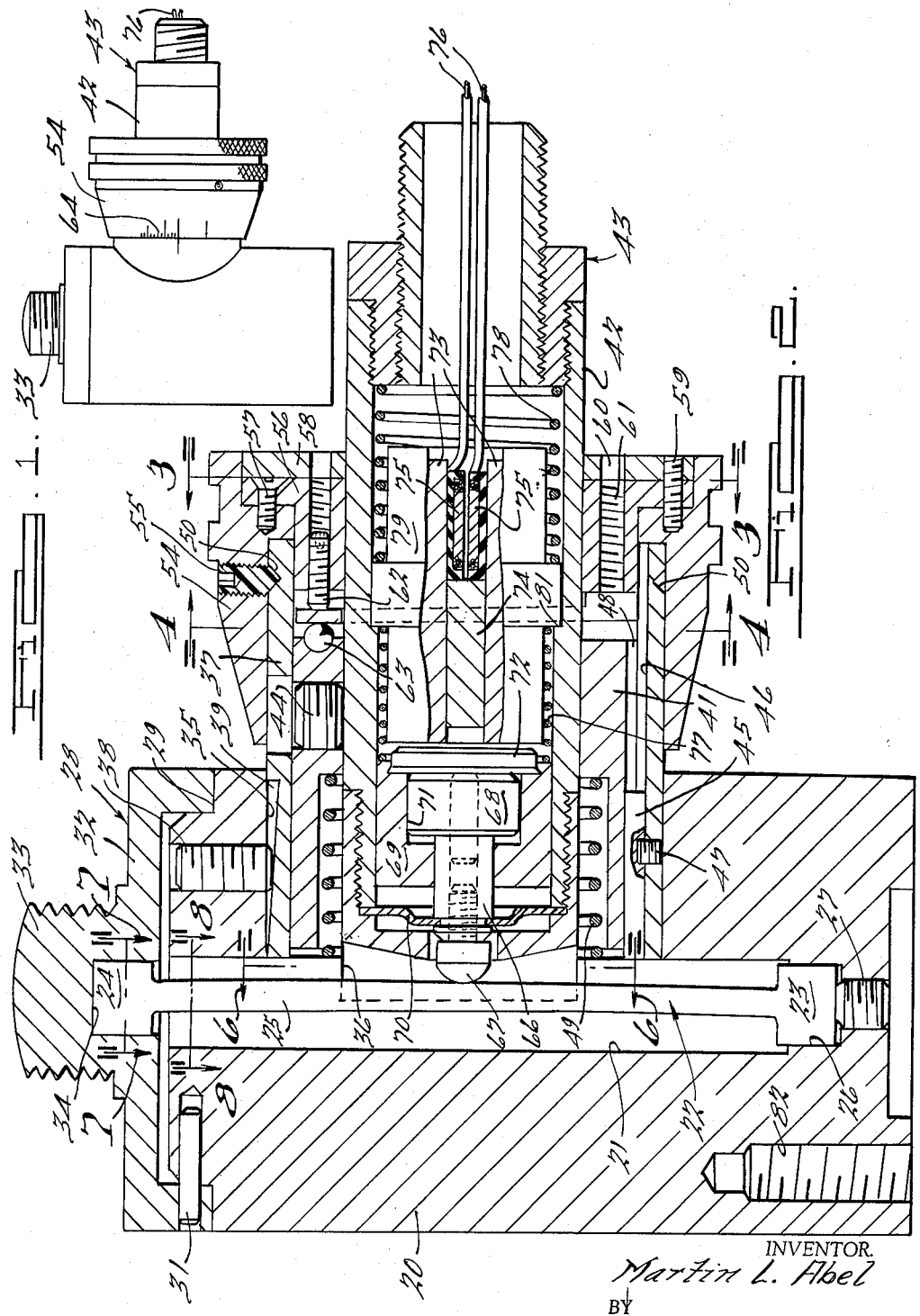
INVENTOR.
Martin L. Abel
BY
Harness, Dickey & Pierce
ATTORNEYS.

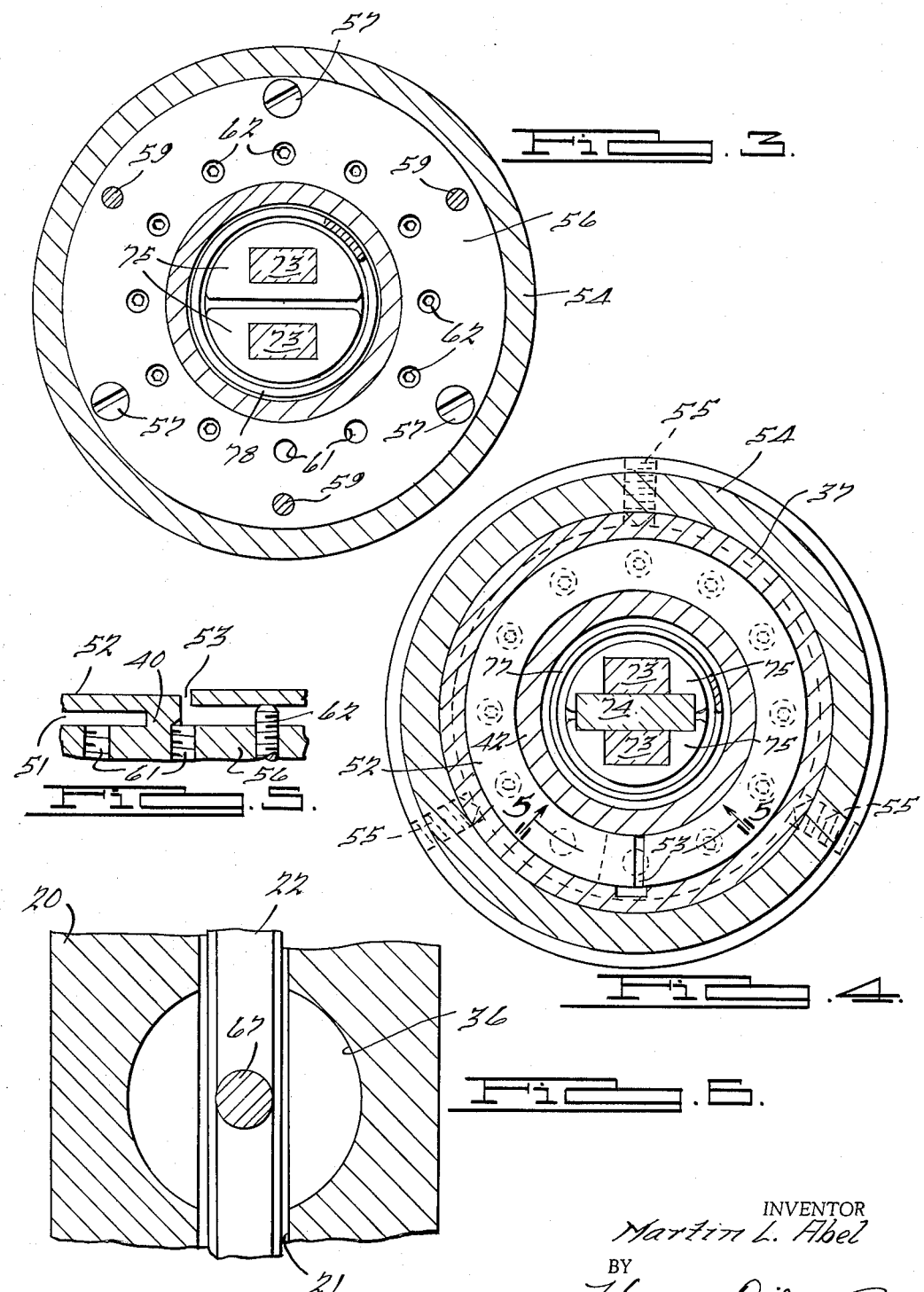

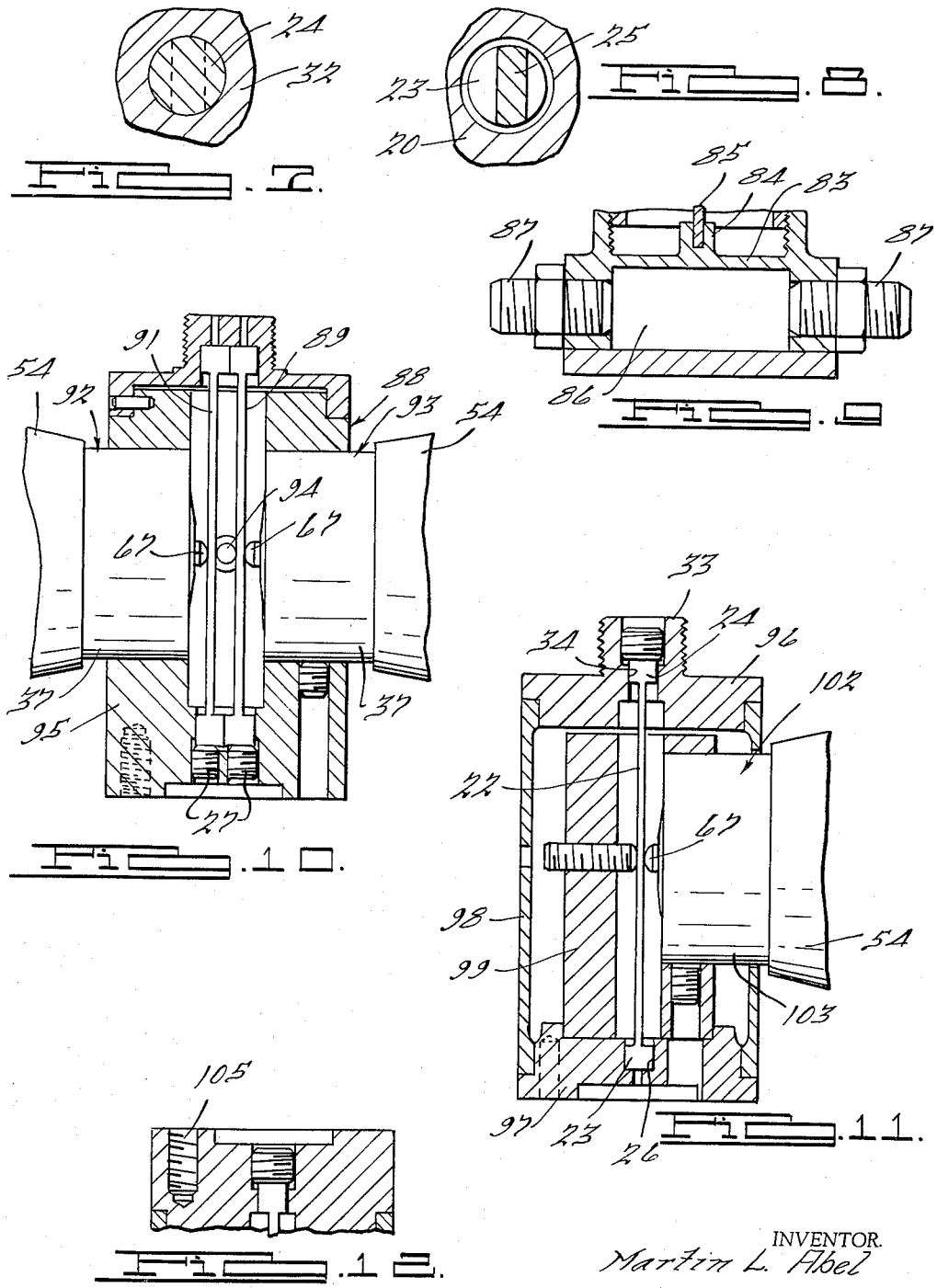

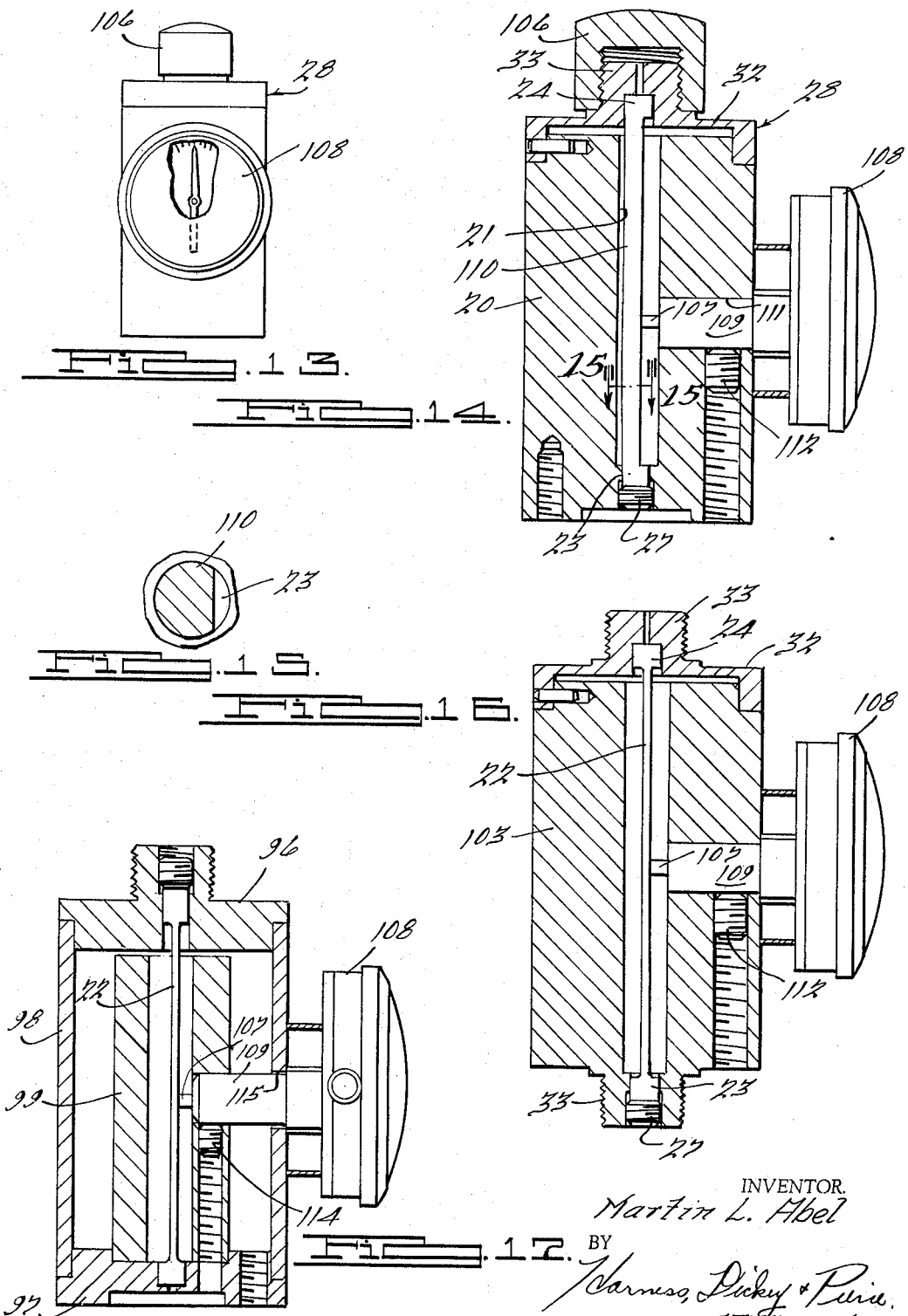

3,246,511
LOAD INDICATING DEVICE
Martin L. Abel, Oak Park, Mich., assignor to
Force Controls Company
Filed Mar. 13, 1963, Ser. No. 264,803
10 Claims. (Cl. 73—141)

This invention relates to force or load indicating devices, and particularly to a device which accurately indicates an applied load in tension or compression.

The invention has particular reference to a motion amplifying device for multiplying extremely small physical movements of a displacement member caused by the application of force to be measured. The relatively large movement of the amplifying member is employed to actuate a device such as a signal generator, an indicating or measuring instrument or the like.

The motion amplifying member of the present invention comprises an elongated bow member which is rigidly secured at its opposite ends to a base member and to a displacement member respectively, the latter of which is deflected by a force which is to be measured. Small physical movements of the displacement member longitudinally of the bow member will cause the latter member to bow a greater or less amount laterally of the length thereof. The lateral movement of the bow member will be many times greater than the distance that the displacement member moved longitudinally thereof and such lateral deflection of the member is used to actuate a signal generator or other indicating instrument. The device may include a mass of metal disposed between the displacement member and base for limiting the movement of the displacement member and prevent the destruction of the device. The device is so designed as to permit sufficient deflection of the displacement member to cause the bow member to change its arc and act on the signal generator or other indicating element.

The motion-amplifying mechanism of the present invention is adapted to be used in any number of installations wherein a force is to be controlled or measured. Such a force may be hydraulic pressure, a weight, a directly applied load which is exerted on the displacement member from which an indication is obtained. Other applications of the device of the invention for controlling and measuring various forces will be apparent to those skilled in the art.

A principal object of the invention is to provide a new and improved mechanical motion amplifying device responsive to an applied force for controlling or measuring its intensity.

A further object of the invention is to provide a motion-amplifying device wherein extremely small movements of a displacement member affects substantially large movements of the amplifying member, which is used to actuate a signal generator or other sensing member, or an indicating or measuring instrument.

Another object of the invention is to provide a device of the type described which is extremely accurate, relatively simple in construction and adapted for use in a wide variety of installations in which a pressure or other load is to be controlled or measured.

Other objects and features of novelty of the invention will be specifically pointed out or will become apparent when referring, for a better understanding of the invention, to the following description taken in conjunction with the accompanying drawings, wherein:

FIGURE 1 is a view in elevation of a force controlling and measuring device embodying features of the present invention;

FIG. 2 is an enlarged sectional view of the structure illustrated in FIG. 1;

FIG. 3 is a sectional view of the structure illustrated in FIG. 2, taken on the line 3—3 thereof;

FIG. 4 is a sectional view of the structure illustrated in FIG. 2, taken on the line 4—4 thereof;

FIG. 5 is a broken sectional view of the structure illustrated in FIG. 4, taken on the line 5—5 thereof;

FIG. 6 is a broken sectional view of the structure illustrated in FIG. 2, taken on the line 6—6 thereof;

FIG. 7 is a broken sectional view of the structure illustrated in FIG. 2, taken on the line 7—7 thereof;

FIG. 8 is a broken sectional view of the structure illustrated in FIG. 2, taken on the line 8—8 thereof;

FIG. 9 is a broken sectional view of the structure, similar to that illustrated in FIG. 2, showing another form of the invention;

FIG. 10 is a view of structure, similar to that illustrated in FIG. 2, showing a still further form of the invention;

FIG. 11 is a view of structure, similar to that illustrated in FIG. 2, showing a still further form which the invention may assume;

FIG. 12 is a broken sectional view of structure, similar to that illustrated in FIG. 11, showing another form thereof;

FIG. 13 is a view in elevation of a device, similar to that of FIG. 1, showing another form which the invention may assume;

FIG. 14 is an enlarged sectional view of the structure illustrated in FIG. 13;

FIG. 15 is an enlarged sectional view of the structure illustrated in FIG. 14, taken on the line 15—15 thereof;

FIG. 16 is a view of structure, similar to that illustrated in FIG. 14, showing another form thereof; and FIG. 17 is a view of structure, similar to that illustrated in FIG. 14, showing another form which the invention may assume.

Referring to FIGURES 1 to 6, the device of the present invention comprises a heavy cylindrical body 20 having an aperture 21 on the center line thereof, containing a bowable element 22 which has a cylindrical head 23 and 24 on the ends of a central flat body portion 25. The head 23 is fixed within a cylinder recess 26 in the body 20 resting upon a screw 27 which may be adjusted from the bottom of the device. A calibrated displacement cap 28 rests upon a shoulder 29 of the heavy body 20 being secured thereon by a plurality of dowel pins 31. The cap has a top calibrated wall 32 of predetermined thickness which is deflected when a load is applied between the bottom of the body portion 20 and a threaded boss 33 located centrally of the wall portion 32. The wall portion and boss have a cylindrical aperture 34 for receiving the head 24 of the bowable element 22 in fixed relation thereto. When a compressive force is to be applied between the bottom of the heavy body 20 and the boss 33, the bowable element 22 is bowed to the right, as illustrated in FIG. 2, through the adjustment of the screw 27. As the load increases between the bottom and the boss, the bowable element will bow a greater distance to the right, as viewed in the figure. A small deflection of the top wall 32 will be magnified many times through the movement of the bow member to the right which provides substantial sensitivity to the device.

An aperture 35 is provided through the side of the heavy body 20, the aperture being countersunk by a smaller aperture 36 disposed centrally thereof. A cylindrical sleeve 37 is press fitted within the aperture 35 and is secured therein by a set screw 38 extending within a sloping slot 39 which securely anchors the sleeve 37 within the aperture. A cylindrical sleeve 41 is longitudinally movable within the sleeve 37 and has secured therein the cylindrical wall 42 of a signal generating device 43. The wall is secured to the sleeve 41 by a set screw 44. A key 45 is secured in a keyway 46 of the inner surface of the sleeve 37 by a screw 47. The key 45 extends within keyway 48 in the cylindrical element 41. A spring 49 in a recess in the sleeve 41 urges the sleeve to the right as viewed in FIG. 2. An adjusting sleeve 54 is disposed about the sleeve 37 for rotation thereon being secured in position by a plurality of screws 55 having pointed ends which extend within an angle groove 50 about the outer surface of the sleeve 37. A flanged sleeve 56 extends within the sleeve 54 and is secured thereto by a plurality of screws 57. A cover plate 58 is secured to the flanged sleeve 56 by a plurality of screws 59 flush with the end of the rotatable sleeve 54.

The end of the flanged sleeve 56 has a slot 51 therein as illustrated in FIG. 5 forming a ring 52 supported thereon by the neck of material 40. A slot 53 adjacent to the neck severs the end of the ring which is movable independent of the other end secured to the neck 40. A plurality of apertures 60 extend through the plate 58 in alignment with threaded aperture 61 in the flanged sleeve 56. Screws 62 are threaded within the threaded apertures 61 for adjusting the angle of slope throughout the length of the ring 52. The opposite side of the ring is engaged by a ball 63 on the sleeve 41 and is moved thereagainst by the spring 49. As the sleeve 54 is rotated, the ring is carried therewith and the sleeve 41 is adjusted longitudinally to a position conforming to the point on the ring engaged by the ball. With this arrangement equal indicia 64 on the rotatable sleeve 54 will be units of the load applied between the base and the boss of the device so that equal units of advancement of the sleeve 54, equal unit loads in calibration of the device.

The rotation of the sleeve 54 moves the signal generating device toward or away from the bowable element 22. The signal generating device 43 is similar to that illustrated and described in the copending application of Martin Abel et al., Serial No. 177,597, filed March 5, 1962, for Transducer, and assigned to the assignee of the present invention. The cylindrical wall 42 of the device supports a spring washer 65 which supports an operating element 66 having an operating button 67 extending therefrom. The operating element 66 has a head 68 thereon which is slidable within a cylindrical element 69 containing an aperture 71 for receiving the head. The aperture 71 is closed by a washer 70 of iron or other magnetic material which is fixed thereto. The washer is spaced from a pair of pole pieces 73 which has a permanent magnet 74 disposed therebetween at the ends adjacent to the washer. The pole pieces 73 have coils 75 on the opposed ends from which leads 76 extend. A spring 77 urges the cylindrical element 69 to the left and the magnetic element 72 away from the pole pieces 73.

When the bowable element 22 has been bowed to the right a sufficient amount, the button 67 is moved to the right to advance the washer 72 toward the ends of the pole pieces 73 adjacent thereto which is free to move against the tension of the spring 77 to bridge the pole pieces independent of the movement of the head 68 after a predetermined advancement. The bridging of the pole pieces 73 changes the flux path therein which induces an electromotive force within the coils 75 and in the leads 76 which is amplified to produce a desired signal or operation. A spring 78 urges a body 79 containing the magnets and coils to the left against a shoulder 81 to prevent the generating device from being damaged if too great a movement is applied to the button 67.

If a force in tension is to be measured, the threaded boss may be attached to a pulling bar and the body may be secured to the plate through the attachment of a plurality of bolts to threaded apertures 82 provided therein. In this arrangement, the bowable element 22 would be bowed to the left a substantial amount by the adjustment of the screw 27 and the generating device 43 would be advanced to the left to have the button 67 contact the bowed element. Upon applying a force in tension between the boss 33 and the bottom of the heavy body 20, the arc in the bowable element 22 will decrease as the force increases, moving the button 67 to the right until the calibrated force of the device has been reached whereupon the washer 72 will bridge the pole pieces 73 and induce an electromotive force in the coils and the conductor 76, which will provide a signal showing that the force has been applied. It will be seen from FIGS. 7 and 8 that the bowable element 22 is a cylindrical rod with the side portions machined away to leave the heads 23 and 24 on the ends of the rectangular central portion 25.

In FIG. 9, a bottom wall 83 is illustrated which takes the place of the distortable wall 32 of FIG. 2, having a central projecting boss 84, to which a bowable element 85 is of flat stock material is fixedly secured. A chamber 86 is provided below the wall 83 having connectors 87 in communication therewith. Conduits are attached to the connectors for a fluid which passes through the chamber 86. The pressure of the fluid in the chamber is measured by the bowing of the bowable element 85 which actuates a signal generating device 45 or other indicating element.

In FIG. 10, a pressure indicating device 88 is illustrated which is similar to that of FIG. 2, with the exception that a pair of bowable members 89 and 91 are employed. Two signal generating devices 92 and 93 are supported on the body 94 of the device each having a sleeve 37 secured in an aperture thereof with the signal generating devices 43 therein. The operating buttons 67 of the generating devices contact the bowable elements 89 and 91 which are bowed toward the buttons being prevented from bowing toward each other by a stud 92 disposed therebetween. The bowable elements 89 and 91 are bowed through the adjustment of the screws 27 in such a manner as to have one of the signal devices operated after a minimum force has been exerted and the other generating device operated after a maximum force has been exerted. When a bearing is to be press fitted into an aperture of an element, assurance is provided by the device that more than a minimum force, registered by one generating device has been employed and not more than a maximum force required to press fit the bearing within the aperture if the other device does not operate. The application of too great a force would contract a bearing and render it inoperative. Less than a minimum pressure may not provide sufficient holding force for the bearing or sufficient contraction to provide a proper diameter for the shaft which is to operate therein.

In FIG. 11, an indicating device is illustrated which has a head 96 and base 97 joined by a cylindrical wall 98 of predetermined thickness. The bowable member 22 has the heads 23 and 24 fixed in apertures 26 and 34 in the base and head respectively. The base supports a heavy cylindrical sleeve 99 which has a screw 101 therein which prevents the bowable element 22 to be bowed to the left and causes it to bow to the right as viewed in the figure. The sleeve 99 is the sole means of supporting the signal generating device 102, the aperture in the wall 98 being larger than the diameter of the supporting sleeve 103 of the device. The operating button 67 of the generating device engages the bowable element 22 and the pressure applied between the head 96 and the base 97 deflects the wall 98 and causes the bowable element 22 to move the operating button 67 to the right to provide a signal when a sufficient load has been applied. The deflection of the material of the sleeve 99 permits the relative movement between the head 96 and the base 97 to produce the bowing of the bowable element 22. A force in tension may be applied between the base 97 and the head 96 when the bowable element is bowed to the left and this may be accomplished by securing the base element 97 to a device and applying a pulling bar to the threaded boss 33 of the head 96.

In FIG. 12, a head 104 is illustrated having a plurality of tapped holes 105 which permits the head to be directly secured to a plate or other element by which a force in tension is applied to the sleeve 99 between the head 96 and base 97. It is to be understood that the sleeve 99 is brazed or otherwise secured to the head and base in firm fixed relation thereto when a force in tension is to be measured.

In FIG. 13, a further form of pressure indicating device is illustrated which is similar to that of FIG. 2 having a heavy body 20 containing a central aperture 21 and a bowable element 22, the head 23 being secured at the bottom of the aperture 21 and the head 24 being secured in an aperture in a cap 28. The threaded boss 33 has a cap 106 thereon to which the load is applied. The bowable element 22 is bowed to the right in engagement with a plunger 107 of a dial indicating device 108 which has a stem 109 secured within an aperture 111 in the body by a set screw 112. The deflection of the top wall 32 measures the load applied to the cap 106, the movement of which is substantially magnified by the bowing of the element 22 which activates the plunger 107 and the dial to directly indicate the load.

In FIG. 16, a load indicating device is shown which is the same as that illustrated in FIG. 14, with the exception that a load in tension is indicated thereby. The heavy body has a boss 33 on each and in the apertures of which the heads 23 and 24 of the bowable element 22 is fixedly secured. The element is bowed to the left a predetermined degree through the adjustment of the screw 27. Tension is provided on the bosses 33 by elements which are directly threaded thereon and the outward deflection of the wall 32 tends to elongate the bowable member 22 and reduce the bow thereof which actuates the plunger 107 to the right to move the dial of the indicating device and provide a reading of the amount of tension which is applied between the bosses 33.

In FIG. 17, a still further form of indicating device is illustrated which is similar to that of FIG. 11, with the exception that a dial indicator 108 is employed in place of the signal generating device 43. In this arrangement the stem 109 of the indicating device 108 is secured to the heavy sleeve 99 by a screw 114. The stem extends through an enlarged aperture 115 in the sleeve 99 which is stressed when a load is applied between the head 96 and the base 97. A load in compression further bows the bowable element 22 toward the dial indicator moving the plunger 107 to actuate the dial indicating device 108 to thereby give an indication of the load applied between the head and base members. The heavy sleeve 99 limits the movement between the head 96 and the base 97 and prevents too much distortion being applied to the material of the sleeve 99 thereby limiting the stress thereof to within the elastic limit of the material.

What is claimed is:

1. In a load-responsive device, a body having an aperture with a head at one end and a base at the opposite end, the central part of the head being deflectable toward the base, a bowable member in the aperture having the ends fixed against lateral displacement to said head and base respectively, means for bowing said bowable member to a predetermined arched position, and an indicating element adjustably supported on said body for moving an actuating member thereof in engagement with said bowable member interjacent the ends thereof.

2. In a load-responsive device, a body having an aperture with a head at one end and a base at the opposite end, the central part of the head being deflectable toward the base, a bowable member in the aperture having the ends fixed against lateral displacement to said head and base respectively, means for bowing said bowable member to a predetermined arched position, an indicating element adjustably supported on said body and having actuating means in engagement with said bowable member interjacent the ends thereof, and means for adjusting the indicating element and said actuating means on said body toward and away from said bowable member.

3. In a load-responsive device, a body having an aperture with a head at one end and a base at the opposite end, the central portion of the head being deflectable toward the base, a bowable member in the aperture having the ends fixed against lateral displacement to said head and base respectively, means for bowing said bowable member to a predetermined arched position, an indicating element adjustably supported on said body and having actuating means in engagement with said bowable member interjacent the ends thereof, and means for adjusting the indicating element and said actuating means on said body toward and away from said bowable member, said moving means including a revolvable split ring and means for adjusting said split ring out of a plane and out of a uniform helical lead, so that the rotation thereof in uniform increments will register uniform units of load to be indicated.

4. In a load-responsive device, a body having an aperture with a head at one end and a base at the opposite end, the central portion of the head being deflectable toward the base, a bowable member in the aperture having the ends fixed against lateral displacement to said head and said base respectively, means for bowing said bowable member to a predetermined arched position, an indicating element supported on said body having actuating means in engagement with said bowable member interjacent the ends thereof, means for adjusting the indicating element and said actuating means on said body toward and away from said bowable member, said adjustable means including a revolvable split ring and means for adjusting said split ring out of a plane and out of a uniform helical lead, so that the rotation thereof in uniform increments will register uniform units of load to be indicated, and means on said indicating element in engagement with said ring to be moved thereby when the ring is adjusted.

5. In a load-responsive device, a body having an aperture, a head on said body having a central deflectable portion containing an aperture aligned with said body aperture, a bowable member in the aperture of the body with one end fixed therein and with the other end fixed in the aperture of the head, means for bowing said bowable member to adjust a preset arc therein, and an indicating element adjustably supported on said body having actuating means movable therewith when adjusted relative to the body into and out of engagement with the bowable member intermediate its end.

6. In a load-responsive device, a body having an aperture, a head on said body having a central deflectable portion containing an aperture aligned with said body aperture, a bowable member in the aperture of the body with one end fixed therein and with the other end fixed in the aperture of the head, means for bowing said bowable member to adjust a preset arc therein, an indicating element having actuating means engageable with the bowable member intermediate its ends, and means for supporting said indicating element on said body for movement with said actuating means toward and away from said bowable member for adjusting the position of the actuating means relative thereto.

7. In a load-responsive device, a body having an aperture, a deflectable head on the body having a central deflectable portion containing an aperture aligned with said body aperture, a bowable member in the aperture of the body with one end fixed therein and with the other end fixed in the aperture of the head, means for bowing said bowable member to adjust a preset arc therein, an indicating element having actuating means engageable with the bowable member intermediate its end, and means for supporting said indicating element on said body for movement along with said actuating means toward and away from said bowable member, the load to be indicated being applied to said head and the opposite end of the body.

8. In a load-responsive device, a body having an aperture, a head on said body having a central deflectable portion containing an aperture aligned with said body aperture, a bowable member in the aperture of the body with one end fixed therein and with the other end fixed in the aperture of the head, means for bowing said bowable member to adjust a preset arc therein, and an indicating element adjustably supported on said body, said element having actuating means movable into and from engagement with the bowable member intermediate its ends when the element and actuating means are adjusted on said body, said indicating element being an electromotive force generating device.

9. In a load-responsive device, a body having an aperture, a head on said body having a central deflectable portion containing an aperture aligned with said body aperture, a pair of bowable members in the aperture of the body with one of the ends fixed therein and with the other end fixed in the aperture of the head, means for bowing said bowable members to predetermined set bowed positions relative to each other, and a pair of indicating elements adjustably supported on said body having actuating means movable therewith when adjusted relative to the body into and out of engagement with the bowable members intermediate their ends, said bowable members and elements individually indicating when two different values of load are applied to the head.

10. A load-responsive device as recited in claim 5 wherein an extension is provided on said head forming a chamber with the central deflectable portion which is deflected to bow the bowable member when fluid pressure is supplied to the chamber for providing indications of the pressure thereof.

References Cited by the Examiner
UNITED STATES PATENTS

| | | | |
|---|---|---|---|
| 410,163 | 9/1889 | Holland | 33—148 |
| 2,362,626 | 11/1944 | Giffen | 73—144 |
| 2,680,376 | 6/1954 | Shaw et al. | 73—88.5 X |
| 3,024,649 | 3/1962 | Taber | 73—398 X |
| 3,073,155 | 1/1963 | Ianuzzi | 73—141 |
| 3,091,961 | 6/1963 | Piell | 73—141 |

FOREIGN PATENTS

| | | |
|---|---|---|
| 859,459 | 6/1940 | France. |
| 377,209 | 1/1932 | Great Britain. |

LOUIS R. PRINCE, *Primary Examiner.*
JOSEPH P. STRIZAK, RICHARD QUEISSER,
*Examiners.*